United States Patent
Kellogg et al.

(10) Patent No.: US 7,498,681 B1
(45) Date of Patent: Mar. 3, 2009

(54) MECHANICAL VIBRATION TO ELECTRICAL ENERGY CONVERTER

(75) Inventors: Rick Allen Kellogg, Tijeras, NM (US); Jay Kristoffer Brotz, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 26 days.

(21) Appl. No.: 11/688,981

(22) Filed: Mar. 21, 2007

(51) Int. Cl.
*H02K 35/00* (2006.01)
(52) U.S. Cl. ..................................... 290/1 R
(58) Field of Classification Search ................ 290/1 R; 310/12, 36; 331/154
See application file for complete search history.

(56) References Cited

U.S. PATENT DOCUMENTS

| | | | | |
|---|---|---|---|---|
| 3,064,096 | A * | 11/1962 | Bosch | 335/92 |
| 3,553,726 | A * | 1/1971 | Zimmerman | 310/15 |
| 3,581,129 | A * | 5/1971 | Ganter et al. | 310/25 |
| 4,500,827 | A * | 2/1985 | Merritt et al. | 322/3 |
| 4,623,808 | A * | 11/1986 | Beale et al. | 310/15 |
| 4,924,123 | A * | 5/1990 | Hamajima et al. | 310/15 |
| 5,347,186 | A * | 9/1994 | Konotchick | 310/17 |
| 5,349,256 | A * | 9/1994 | Holliday | 310/12 |
| 5,543,956 | A * | 8/1996 | Nakagawa et al. | 359/225 |
| 5,818,132 | A * | 10/1998 | Konotchick | 310/17 |
| 5,909,068 | A * | 6/1999 | Wakiwaka et al. | 310/15 |
| 6,276,313 | B1 * | 8/2001 | Yang et al. | 123/46 E |
| 6,538,349 | B1 * | 3/2003 | Lee et al. | 310/15 |
| 6,611,140 | B1 | 8/2003 | Bloechl et al. | |
| 6,750,596 | B2 * | 6/2004 | Kim et al. | 310/339 |
| 6,751,395 | B1 * | 6/2004 | Novotny et al. | 385/140 |
| 6,812,583 | B2 * | 11/2004 | Cheung et al. | 290/1 R |
| 6,984,902 | B1 * | 1/2006 | Huang et al. | 310/26 |
| 7,064,876 | B2 * | 6/2006 | Cannon et al. | 359/204 |
| 7,078,832 | B2 * | 7/2006 | Inagaki et al. | 310/12 |

(Continued)

FOREIGN PATENT DOCUMENTS

EP 1841049 A1 * 10/2007

(Continued)

OTHER PUBLICATIONS

Mitcheson, P.D., Green, T.C., Yeatman, E.M., Holmes, A.S., "Architectures for Vibration-Driven Micropower Generators", J. Microelectromech. Syst., vol. 13, No. 3, Jun. 2004, pp. 429-440.

(Continued)

*Primary Examiner*—Joseph Waks
(74) *Attorney, Agent, or Firm*—William R. Conley (57) ABSTRACT

Electromechanical devices that generate an electrical signal in response to an external source of mechanical vibrations can operate as a sensor of vibrations and as an energy harvester for converting mechanical vibration to electrical energy. The devices incorporate a magnet that is movable through a gap in a ferromagnetic circuit, wherein a coil is wound around a portion of the ferromagnetic circuit. A flexible coupling is used to attach the magnet to a frame for providing alignment of the magnet as it moves or oscillates through the gap in the ferromagnetic circuit. The motion of the magnet can be constrained to occur within a substantially linear range of magnetostatic force that develops due to the motion of the magnet. The devices can have ferromagnetic circuits with multiple arms, an array of magnets having alternating polarity and, encompass micro-electromechanical (MEM) devices.

12 Claims, 11 Drawing Sheets

U.S. PATENT DOCUMENTS

| | | | | |
|---|---|---|---|---|
| 7,142,075 | B1 * | 11/2006 | Roesler et al. | 335/78 |
| 7,148,591 | B2 * | 12/2006 | Mizoguchi et al. | 310/36 |
| 7,231,874 | B2 * | 6/2007 | Rastegar et al. | 102/207 |
| 2004/0000713 | A1 * | 1/2004 | Yamashita et al. | 257/728 |
| 2006/0176153 | A1 * | 8/2006 | Tang | 340/10.4 |
| 2007/0231944 | A1 * | 10/2007 | Kvisteroy | 438/52 |
| 2008/0116856 | A1 * | 5/2008 | Roberts et al. | 322/3 |
| 2008/0136562 | A1 * | 6/2008 | Kulah et al. | 333/186 |

FOREIGN PATENT DOCUMENTS

| | | | |
|---|---|---|---|
| GB | 2425160 A | * | 10/2006 |
| GB | 2425222 A | * | 10/2006 |
| GB | 2429337 A | * | 2/2007 |
| GB | 2431055 A | * | 4/2007 |
| JP | 2006296144 A | * | 10/2006 |

OTHER PUBLICATIONS

Mizuno, M., Chetwynd, D.G., "Investigation of a Resonance Microgenerator", J. Micromech. Microeng., vol. 13, Jan. 2003, pp. 206-216.

Kulah, H. Najafi, K., "An Electromagnetic Micro Power Generator for Low-Frequency Environmental Vibrations", Proceedings of the IEEE Internatiional Conference on Micro Electro Mechanical Systems (MEMS), 2004, pp. 237-240.

Glynne-Jones, P., Tudor, M.J., Beeby, S.P., White, N.M., "An Electromagnetic, Vibration-Powered Geneator for Intelligent Sensor Systems", Sensor and Actuators A, vol. 110, 2004, pp. 344-349.

Sasaki, K., Osaki, Y., Okazaki, J., Hosaka, H., Itao, K., "Vibration-based Automatic Power-Generation System", Microsyst. Technol. 2005, vol. 11, pp. 965-969.

Williams, C.B., Shearwood, C., Harradine, M.A., Mellor, P.H., Birch, T.S., Yates, R.B., "Development of an Electromagnetic Micro-Generator", IEEE Proc. Circuits Devices Syst., vol. 148, No. 6, Dec. 2001, pp. 337-342.

El-Hami, M., Glynne-Jones, P., White, N.M., Hill, M., Beeby, S., James, E., Brown, A.D., Ross, J.N., "Design and Fabrication of a New Vibration-Based Electromechanical Power Generator", Sensors and Acturators A, vol. 92, 2001, pp. 335-342.

Amirtharajah, R., Chandrakasan, A.P., "Self-Powered Signal Processing Using Vibration-Based Power Generation", IEEE J. Solid-State Circuits, vol. 33, No. 5, May 1998, pp. 687-695.

Meninger, S., Mur-Miranda, J.O., Amirtharajah, R., Chandrakasan, A.P., Lang, J.H., IEEE Trans. on Very Large Scale Int. (VLSI) Sys., vol. 9, No. 1, Feb. 2001, pp. 64-76.

Siebert, J., Collier, J. Amirtharajah, R., "Self-Timed Circuits for Energy Harvesting AC Power Supplies", Pro. of the Int. Symp. on Low Power Electronics and Design, 2005, pp. 315-318.

* cited by examiner

Pickup and Guard Magnetic Induction Response for 17-Magnet Array

Figure 7A

Force Response for 17-Magnet Array

Figure 7B

MECHANICAL VIBRATION TO ELECTRICAL ENERGY CONVERTER

STATEMENT REGARDING FEDERALLY SPONSORED RESEARCH OR DEVELOPMENT

The United States Government has certain rights in this invention pursuant to Department of Energy Contract No. DE-AC04-94AL85000 with Sandia Corporation.

FIELD OF THE INVENTION

The invention generally relates to methods and apparatus for generating an electrical signal in response to an external source of mechanical vibrations. Embodiments of the invention operate to convert mechanical energy in the form of vibrations into electrical energy, and can operate as sensors and converters of mechanical to electrical energy. The invention additionally relates to vibration-based energy harvesters and furthermore to velocity damped resonant generators (i.e. VDRGs). Embodiments of the invention can be fabricated as micro-electromechanical (MEM) devices.

BACKGROUND OF THE INVENTION

As wireless computing and distributed sensor networks become more mature and widespread, a bottleneck for the technology deployment becomes the power source. Conventionally, a wireless, portable sensor or microprocessor is powered by a battery. Though battery technologies have improved, energy densities and lifetimes are still issues for many systems. A battery holds a finite amount of energy; when that energy has been used by its load, the battery must be recharged. For many remote systems, recharging a battery is not an option. If a system is required to remain idle for months or years and then spring to life at a certain moment, a battery may have been depleted already due to leakage or self-discharge. Finally, batteries often involve chemicals which are harmful to humans and to the environment. The present invention provides a solution to these problems in the form of an energy harvesting device for supplying power to (inter alia) small remote systems and conversely as a sensor for sensing vibrations in its environment and generating an electrical signal in response thereto. Applications where harvesting or sensing vibrations can be desired include; air, water and land-based vehicles, oil rigs, heavy machinery, bridges and other architectural structures subjected to vibrations. The terms "vibration sensing device", "vibrational energy converter", "vibrational energy harvester", "energy harvester", and "mechanical vibration to electrical energy converter" are interchangeable in the context of this specification.

BRIEF DESCRIPTION OF THE DRAWINGS

The accompanying drawings, which are incorporated in and form part of the specification, illustrate several embodiments of the present invention and, together with the description, serve to explain the principles of the invention. The drawings provided herein are not drawn to scale.

DETAILED DESCRIPTION OF THE INVENTION

A framework for analyzing vibrational energy harvesters for various types of generators is provided in: Mitcheson, P. D., Green, T. C., Yeatman, E. M., and Holmes, A. S., "Architectures for Vibration-Driven Micropower Generators", J. Microelectromech. Syst., Vol. 13, No. 3, June 2004, pp. 429-440, which is incorporated by reference in its entirety herein. Mitcheson et al., describe velocity-damped resonant generators, coulomb-damped resonant generators, and Coulomb-damped parametric generators. The present invention comprises velocity-damped resonant generators (VDRGs) that utilize magnetic induction to convert mechanical vibrations into an electrical signal for sensing and power generation. Embodiments of the present invention can be fabricated using conventional macro-scale technologies (e.g. dimensions greater than a few millimeters) and meso or micro-scale technologies (e.g. dimensions on the order of a few millimeters or less).

Microelectromechanical (MEM) fabrication technologies (e.g. meso and micro-scale device technologies) include; surface micromachining, e.g. methods based on integrated circuit (IC) and semiconductor device manufacture, bulk micromachining, focused ion beam (FIB) processing, LIGA (an acronym based on the first letters for the German words for lithography, electroplating and molding). These technologies and combinations thereof can be used to form microdevices, Microsystems, microsensors, micro-power generators and microactuators. These MEM fabrication technologies can provide (e.g. as in the case for surface micromachining) for batch fabrication of multiple devices, that are fully assembled as-fabricated, requiring little to no post fabrication assembly. Dimensions of structures fabricated by MEM technologies can range from on the order of 0.1 µm, to on the order of a few millimeters, and include silicon, polysilicon, glass, dielectric and metallic structures that are either unsupported (i.e. free standing) or alternatively can be adhered to a substrate, or built up upon a substrate during manufacture. Devices fabricated using MEM technology are referred to as MEM devices, and can be incorporated into micro-electromechanical systems (MEMS).

Substrates as used in supporting micro and meso scale process technologies, can comprise ceramics, glass-ceramics, low-temperature co-fireable ceramics (LTCC), quartz, glass, a printed wiring board (e.g. manufactured of polymeric materials including polytetrafluoroethylene, polyimide, epoxy, glass filled epoxy), silicon (e.g. silicon wafers) and metals. Dielectric layers, for example, polymeric, silicon-oxide, silicon-nitride, glass and ceramic layers can be applied to the surface of conductive substrates (e.g. metallic and silicon substrates) to electrically isolate individual MEM structures or MEM elements within a structure. In the context of the present disclosure, MEM devices are defined to be those devices manufactured using one or more of the MEM fabrication technologies described above, and having dimensions ranging from on the order of 0.1 µm, to on the order of a few millimeters.

An example LIGA technology comprises lithographic processing of a resist material (e.g. polymethylmethacrylate, PMMA) sensitive to x-ray radiation. The PMMA is typically adhered to a flat, planar surface such as that of a silicon wafer, having a thin layer of metal (e.g. as a release layer) on its surface. Highly parallel x-rays from a synchrotron radiation source are incident upon a mask patterned with a high atomic number (Z) absorber (e.g. chromium). The absorbers on the mask are thick enough to prevent the penetration of x-rays. In the open areas of the mask, the radiation passes through and exposes the PMMA resist. The resist is then chemically developed causing the exposed areas to be washed away. The resulting PMMA structure is then used as a mold for an electro-deposition, to produce a metal (e.g. nickel, nickel-iron alloys, copper, gold etc.) part in the developed regions, replicating the outline of the original mask pattern. The metal parts can then be chemically released from the supporting wafer by dissolving away the PMMA and underlying release layer, and used as is, or the electroplated part can be used as a mold for replication in another material such as a plastic or ceramic. The LIGA process produces MEM parts, which must subsequently be assembled to complete a device. Minimum feature size can be approximately 20 microns, with dimensional accuracies of less than 0.1 micron. Feature thicknesses can range from about 100 micron to 3 millimeter. Feature size to thickness, aspect ratio's, are typically maintained up to about 50:1.

An element of an energy harvester is a mechanism to convert or transduce mechanical energy into electrical energy, in a very compact form factor. This conversion can be accomplished in a number of ways including electro-static, piezoelectric and electromagnetic methods. An electromagnetic approach is well suited to velocity-damped resonant generators (VDRGs) as mechanical impedance matching may be achieved through the low-force coupling provided by dynamic magnetic damping. Additionally, an electromagnetic approach can accommodate linear-motion and provide adequate power densities in a compact configuration.

The Faraday-Lenz law, Equation 1, is fundamental to electromagnetic transduction. It states that the voltage, V, induced in a conductor of N turns is proportional to the rate of change of the magnetic flux, $\phi$, enclosed by that conductor and, the induced voltage is in a direction such that it opposes the flux change:

$$V = -N\frac{d\phi}{dt}. \quad \text{(Eqn. 1)}$$

The function of the electromagnetic transduction component is to convert its mechanical input or motion into a changing magnetic flux within a coil. The present invention employs a high permeability core "Hi-$\mu_r$ Core" (e.g. ferromagnetic core), transduction approach, which avoids deficiencies that can be associated with air-core electromagnetic transduction devices.

Figure 1:
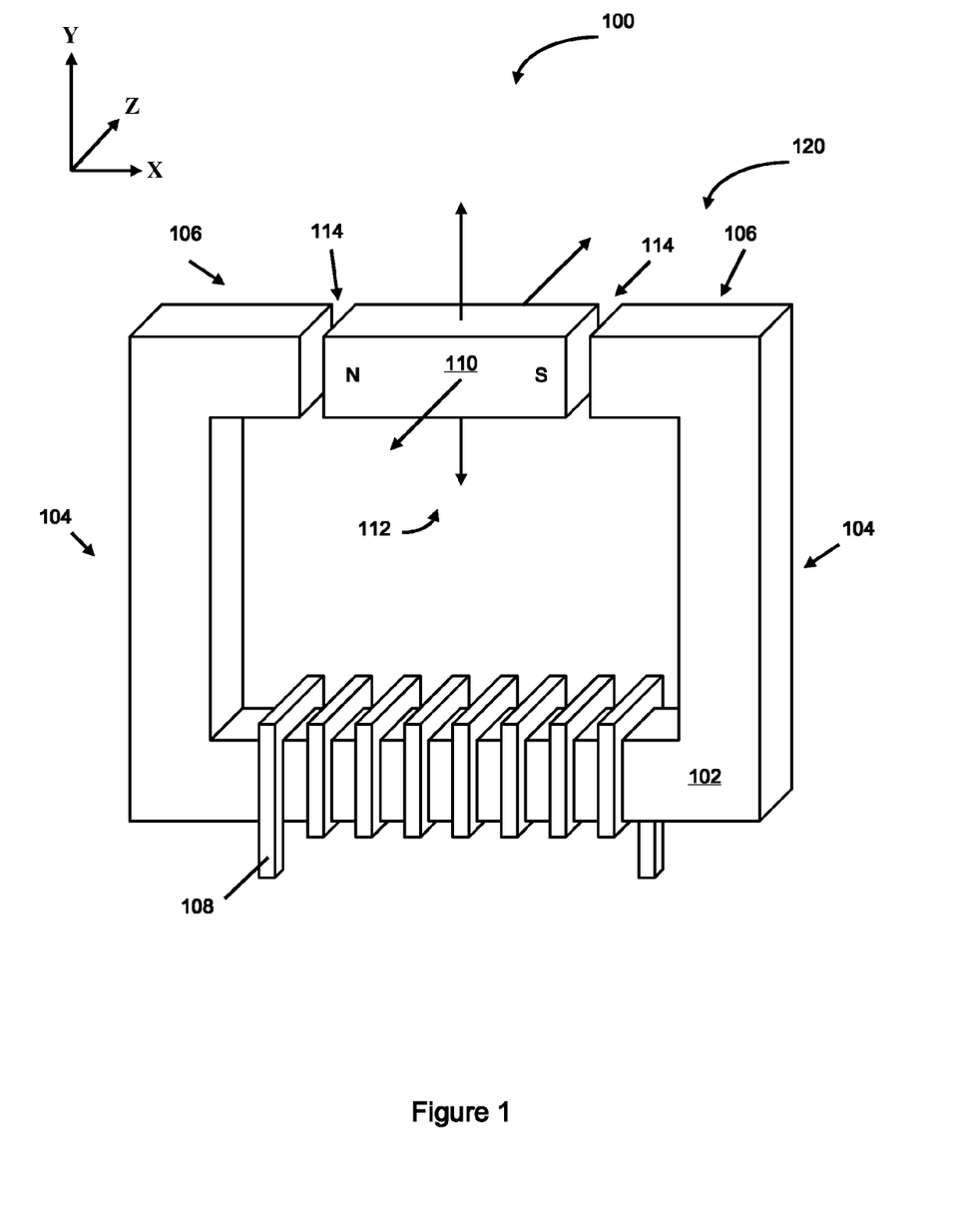
FIG. 1 is a schematic perspective illustration of a first embodiment of a mechanical vibration to electrical energy converter according to the invention.

FIG. 1 is a schematic perspective illustration of the "Hi-$\mu_r$ Core" transduction approach, as can be used in the construction of a mechanical vibration to electrical energy converter 100 (i.e. a vibration sensor and/or vibration based energy harvester) according to the present invention. Converter 100 comprises a ferromagnetic circuit 120 that includes a core 102 around which an electrically conductive coil 108 is wound, as well as yoke 104 and pickup 106 portions. The ferromagnetic circuit 120 comprises a gap 112 through which a magnet 110 can travel. A clearance 114 is maintained at both ends of the magnet 110, between the magnet and the pickup 106 ends of the ferromagnetic circuit.

In the context of the present invention, a ferromagnetic circuit comprises a closed loop through which magnetic flux flows, is formed from ferromagnetic materials and has one or more air gaps. Embodiments of the invention can incorporate a ferromagnetic circuit arranged as pickups, yoke and core fabricated from ferromagnetic materials (e.g. iron, Permalloy, soft magnetic alloys etc.) including an air gap through which a magnet traverses.

A closed magnetic circuit is formed by the magnet 110, core 102, yoke 104 and clearances 114 separating the magnet 110 from the pickups 106. The clearances 114 allow for free motion of the magnet through the gap 112, but can be minimized to obtain a maximum magnetic flux linkage. Motion of the magnet 110 in and/or through the gap 112 in either the "Z" or "Y" directions as indicated in FIG. 1 will induce a voltage in the coil 108.

Several advantages of the "Hi-$\mu_r$ Core" become evident by expanding the Faraday-Lenz law of Equation 1, and by considering the motion of the magnet to occur substantially along the "Z" axis yields:

$$V(t) = -N\frac{d\phi}{dt} = -NA\frac{dB}{dt} = -NA\mu_0\mu_r\frac{dH}{dt} = -NA\mu_0\mu_r\frac{dH}{dz}\frac{dz}{dt} \quad \text{(Eqn. 2)}$$

in which, $\mu_o = 4\pi \times 10^{-7}$ H/m is the permeability of free space, $\mu_r$, is the relative permeability of the core and, H, A/m is the magnetomotive force or equivalently, the magnetic field provided by the magnet. A relatively large volume containing an increased rate of change in magnetic flux density, $$\frac{dB}{dt},$$

is therefore provided for winding a coil by using a high-permeability core. Values of $\mu_r$ greater than 1000 are easily achieved in ferromagnetic materials such as in iron, where in contrast, $\mu_r$=1 for air. This large volume with high flux then provides ample room on which to wrap a high-turn count coil and to ultimately produce larger voltage outputs.

In the application of an energy harvester based on the "Hi-$\mu_r$ Core" approach, additional factors can be considered. The static magnetic force, also referred to as magnetostatic force, magnetic return force, translational force and/or cogging force, operates to return the magnet to a position where it is aligned with the ferromagnetic core (i.e. in alignment with the pickup portions of the ferromagnetic circuit) when the magnet is displaced from the aligned (i.e. neutral) position. The magnetostatic force acting on the magnet is dependent on the location of the magnet relative to the pickup portions of the core and therefore the magnitude of this force varies as the magnet traverses the gap.

Additionally, the ferromagnetic components experiencing changing flux have the potential to act as power sinks due to magnetic hysteresis and eddy current losses. To minimize magnetic hysteresis losses, materials comprising the ferromagnetic circuit can be used which are "magnetically soft", having low magnetic coercivity, $H_c$ A/m. These materials additionally have high relative permeabilities, $\mu_r$, and high saturation magnetic induction, $B_s$ Tor Tesla, both properties supporting greater core flux changes. These parameters can be obtained from plots of the hysteresis loop (i.e. "B vs. H curves") for ferromagnetic materials as is well known in the art. Examples of ferromagnetic materials include iron (H=80 A/m, u=5000 and, $B_s$=2.15 T) grain-oriented silicon iron ($H_c$=40 A/m, $\mu_r$=40000 and, $B_s$=2.0 T) and alloys of nickel and iron marketed under the PERMALLOY trademark such as 78 Permalloy ($H_C$=4 A/m, $\mu_r$=100000 and, $B_s$=1.08 T). 78 Permalloy can be useful in fabricating compact energy harvesters (e.g. in the micro to meso scale) as the microfabrication processes involved are fairly mature, for example as in LIGA.

Eddy current losses occur because current loops are induced in the ferromagnetic circuit material by the changing magnetic flux which is ultimately coupled into the coil. Current loops form in the planes of the ferromagnetic circuit material normal to the direction of the flux and, the power loss is dependant on the cross-sectional area of those planes. Fabricating the ferromagnetic circuit components as a laminated stack-up of thin layers, therefore reducing the effective ferromagnetic circuit or plane thickness for the development of Eddy current losses, is one approach to minimizing the Eddy current losses. MEM technologies (e.g. LIGA) are one approach that can be utilized to produce a laminated ferromagnetic circuit (e.g. core, yoke and pickups) comprising multiple thin layers of ferromagnetic material.

Figure 2A:
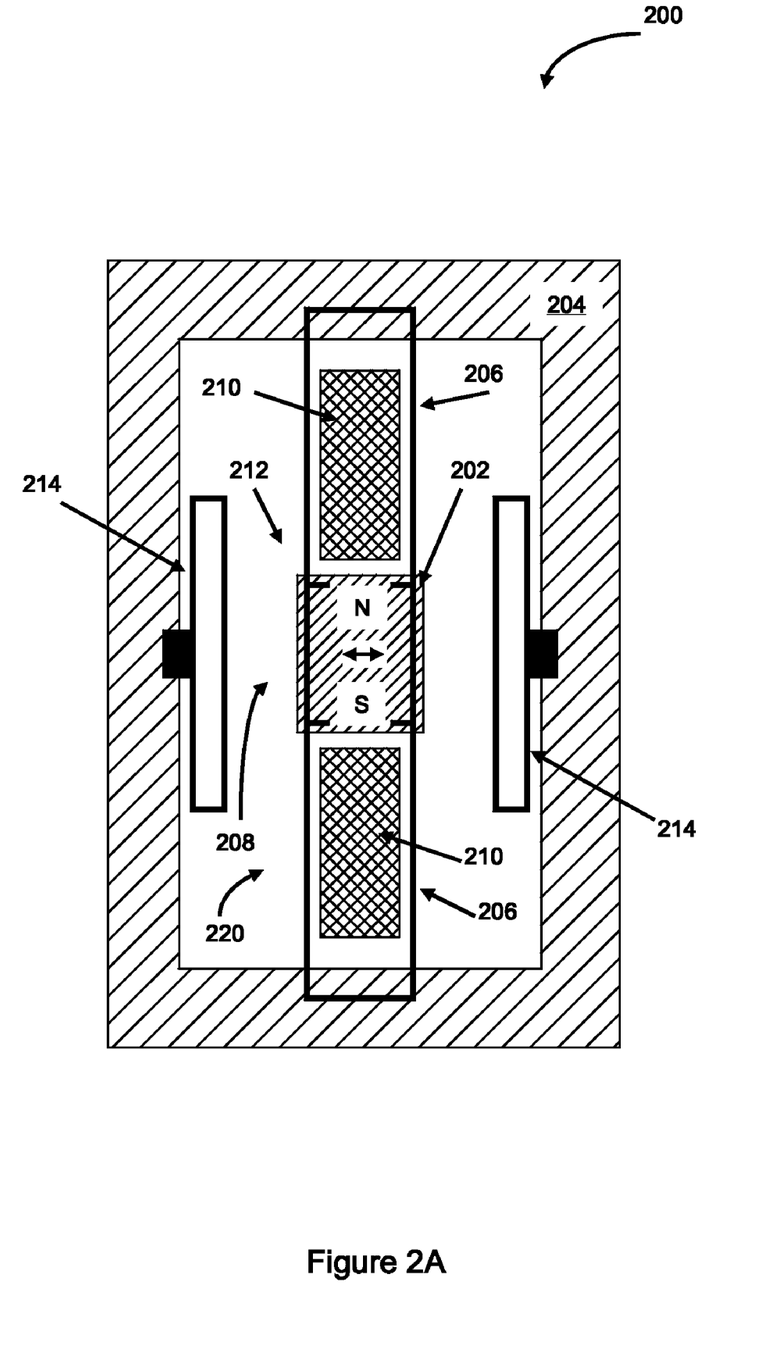
FIG. 2A is a schematic plan view illustration of a second embodiment of a mechanical vibration to electrical energy converter according to the invention, wherein the magnet is in a neutral position.

FIG. 2A is a schematic plan view illustration of a second embodiment of an apparatus 200 for converting mechanical vibrations into electrical energy, according to the present invention. A magnet 202 is connected to a frame 204 by a coupling 206 which serves to align and guide the magnet 202 disposed within a gap 208 in a ferromagnetic circuit 220. The north "N" and south "S" poles of the magnet 202 are aligned with the pickup portions 210 of the ferromagnetic circuit 220. In this particular embodiment, the ferromagnetic circuit 220 (e.g. yoke, core and pickups) is arranged perpendicular (i.e. extends into and out of the plane of the illustration) to the plane defined by the frame 204. An electrically conductive coil (not shown) can be wrapped around the core, lying above (or below) the plane of the illustration. Coupling 206 is illustrated as a structure comprising flexible, "springs" which serve to allow motion of the magnet 202 to occur substantially in the Z-direction as indicated by the double arrow, e.g. back and forth, partially or wholly through the gap and substantially perpendicular to the plane defined by the ferromagnetic circuit 220. In the illustration, the coupling 206, i.e. spring, is shown as comprising two legs, i.e. beams of equal length. The coupling 206 can comprise a plurality of beams, for example to increase the rigidity of the coupling in directions other than "Z". Springs comprising beams of different lengths and folded flexure configurations may be employed as well, depending on the application. The coupling could as well comprise other structures, for example, a "track" structure allowing the magnet 202 to travel back and forth on the track, in applications where appropriate.

The coupling 206 is fastened to the magnet 202 and the frame 204, and additionally serves to maintain a clearance 212 (e.g. an air gap) between the magnet 202 and the pickups 210 to reduce frictional forces that may occur as the magnet 202 travels back and forth across the gap 208. The size of the clearance 212 is not critical to the practice of the invention and can be adjusted as needed, balancing minimizing the clearance to increase flux density with the tolerance capabilities of the overall system.

The energy harvester 200 can be attached to a body or structure subjected to mechanical vibrations by means of the frame 204. Vibrations (e.g. from an external source) can be coupled into the frame 204 and cause the magnet 202 to move back and forth through the gap 208. Motions of the magnet 202 into and out of the plane of the illustration (e.g. "up and down") are not necessarily detrimental to the practice of the invention and can occur due to the compliance and flexibility of the coupling 206. Therefore, the motion of the magnet 202 through the gap is considered to be "substantially" within the plane of the frame 204, and "substantially" in the Z-direction as indicated by the double arrow.

For convenience in the illustration, the magnet 202 is shown to be "wider", i.e. extending beyond the extents of the pickups 210 in the Z-direction. These relative dimensions are not critical to the practice of the invention and it may be convenient in many applications for the width of the magnet 202 to be substantially equal to the width of the pickups 210. The magnet 202 can comprise a magnet housed within a structure or housing that can serve to add mass to the system, as part of the design process to adjust the operating or resonant frequency of the velocity damped system (See Mitcheson et al.).

Figure 2B:
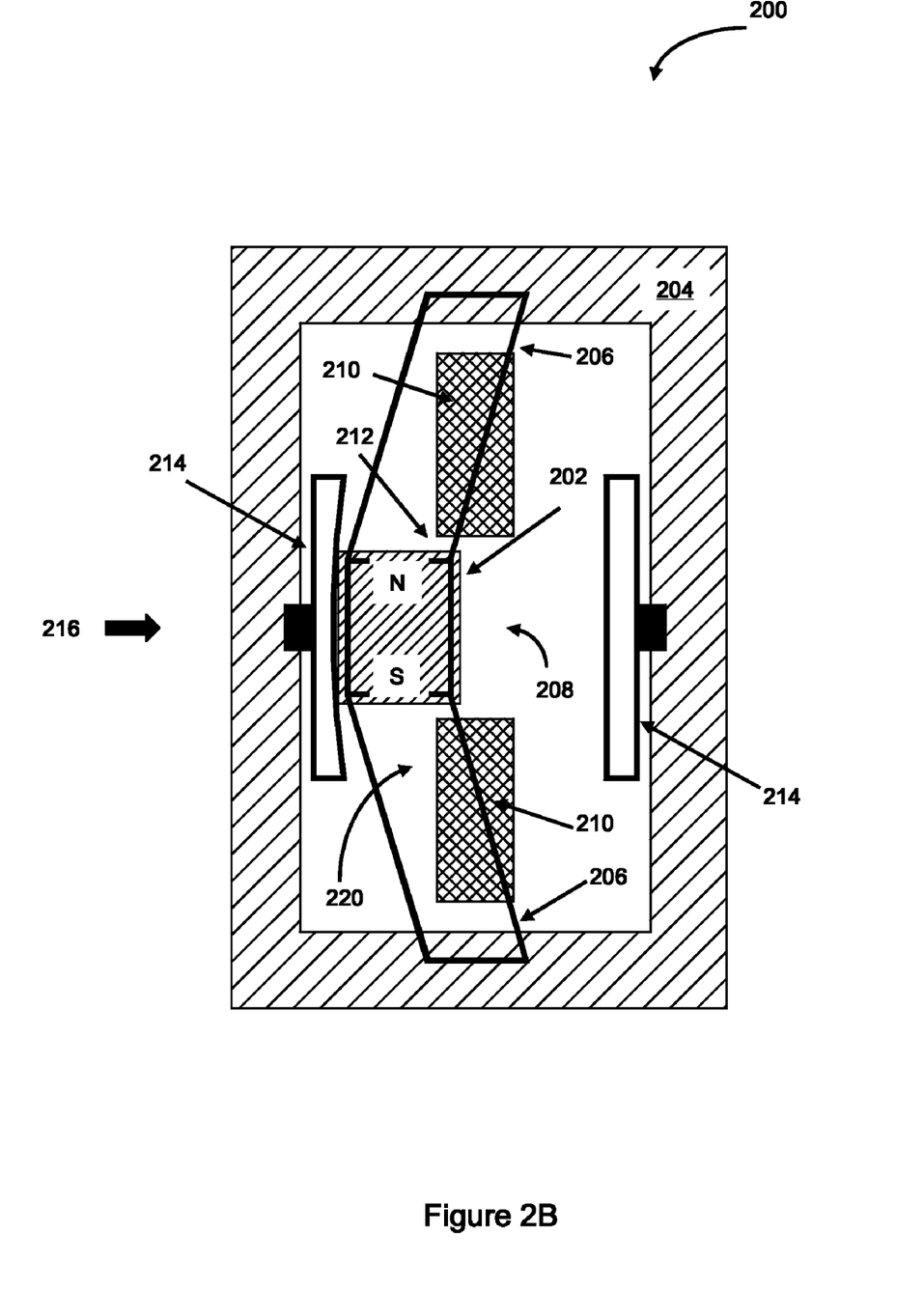
FIG. 2B is a schematic plan view illustration of the second embodiment of a mechanical vibration to electrical energy converter according to the invention, wherein the magnet is displaced to the left.

FIG. 2B is a plan view schematic illustration of the energy harvester 200 subjected to an external vibration. A resultant force 216 (i.e. resultant from the vibrations) operates on the apparatus 200 and causes the magnet 202 to be moved to the left relative to the pickups 210, due to the inertial force acting on the magnet 202. A "magnetic restoring force" is developed that serves to force the magnet 202 back into alignment with the pickups 210. As will be discussed below, it can be desired to limit the extent of the motion of the magnet 202 relative to the pickups 210 through the use of a restrainer 214. Restrainer 214 (e.g. bumper, limiter, motion restrictor) can comprise a hard stop, a stop comprising a resilient material or as illustrated, a spring. Incorporating a spring or resilient material in the restrainer 214 can be beneficial in producing a mechanical return force that in addition to the magnetic return force, acts to return the magnet 202 to the "neutral" position, aligned with the pickup portions 210 of the ferromagnetic circuit 220, after a displacement of the magnet 202. This can additionally be beneficial when the force 216 acting on the frame 204 is large, and can facilitate the collection of energy from severe vibrational fields. Alternatively, the restrainer (e.g. springs in the restrainer and/or coupling) can be designed to produce a mechanical spring force that operates in a direction opposed to the magnetic return force, to partially or totally cancel the magnetic return force. The total spring force (mechanical plus magnetic) operating on the magnet mass could then be reduced allowing a lower resonant frequency (see Mitcheson et al.) for a device.

Figure 2C:
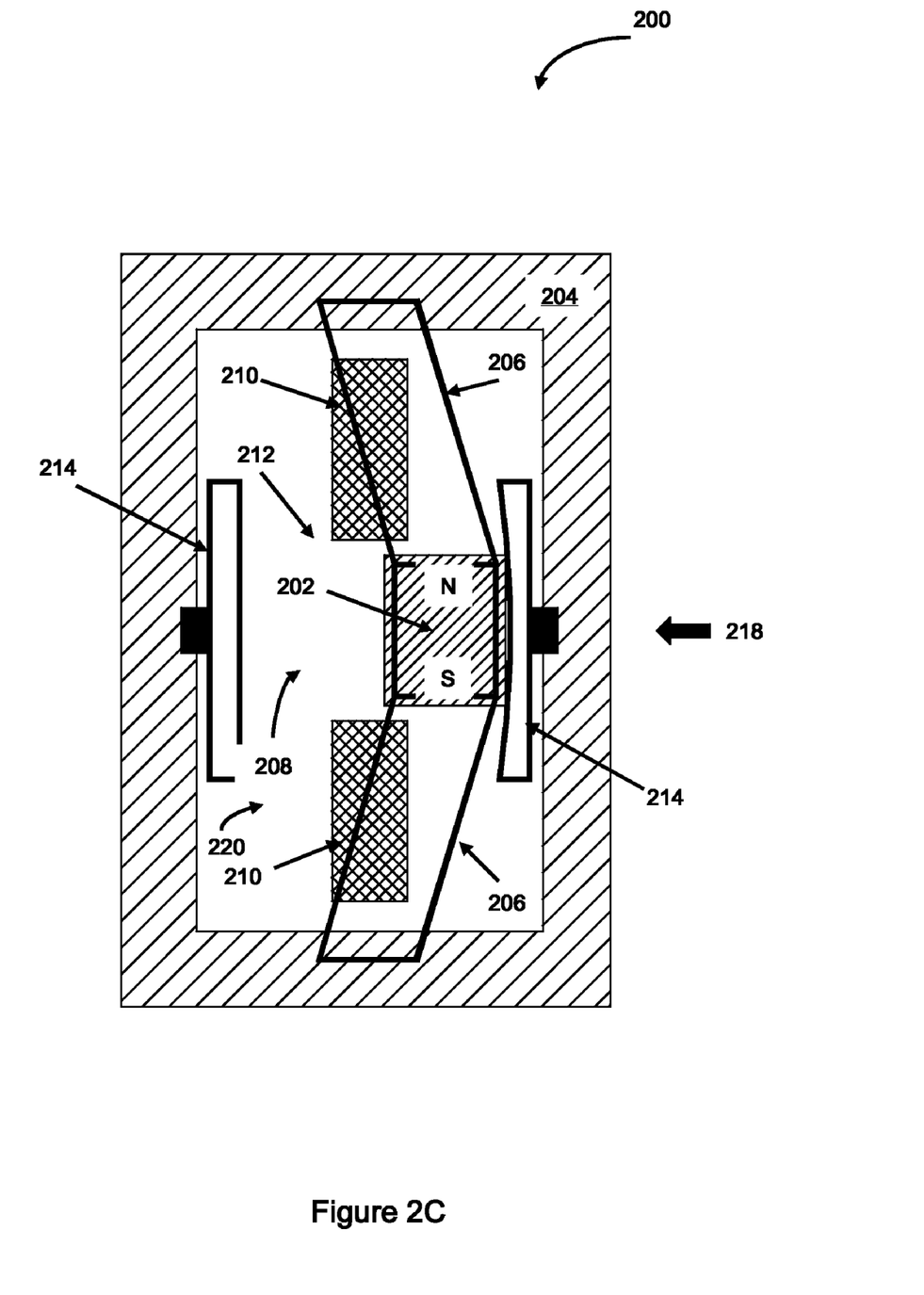
FIG. 2C is a schematic plan view illustration of the second embodiment of a mechanical vibration to electrical energy converter according to the invention, wherein the magnet is displaced to the right.

FIG. 2C is a schematic plan view illustration of the energy harvester 200 subjected to an external vibration. A resultant force 218 operates on the harvester 200 and causes the magnet 202 to be moved to the right relative to the pickups 210. As shown in FIGS. 2A through 2C, the motion of the magnet 202 back and forth through the gap 208 in the ferromagnetic circuit 220 under the influence of external vibrational forces, induces a voltage in a coil (not shown) that can be wrapped around the core 210. By this manner, apparatus 200 can function to generate electrical power in response to an external vibration source (e.g. function as an energy harvester) or as well can produce an electrical signal in response to an external vibration source (e.g. function as a vibration sensor). Embodiments of the present invention anticipate configurations where a magnet is movably coupled to a frame or as well where a ferromagnetic circuit (e.g. pickups, core and yoke) is movably attached to a frame, and a gap in the movable ferromagnetic circuit translates relative to a "stationary" magnet.

Figure 3:
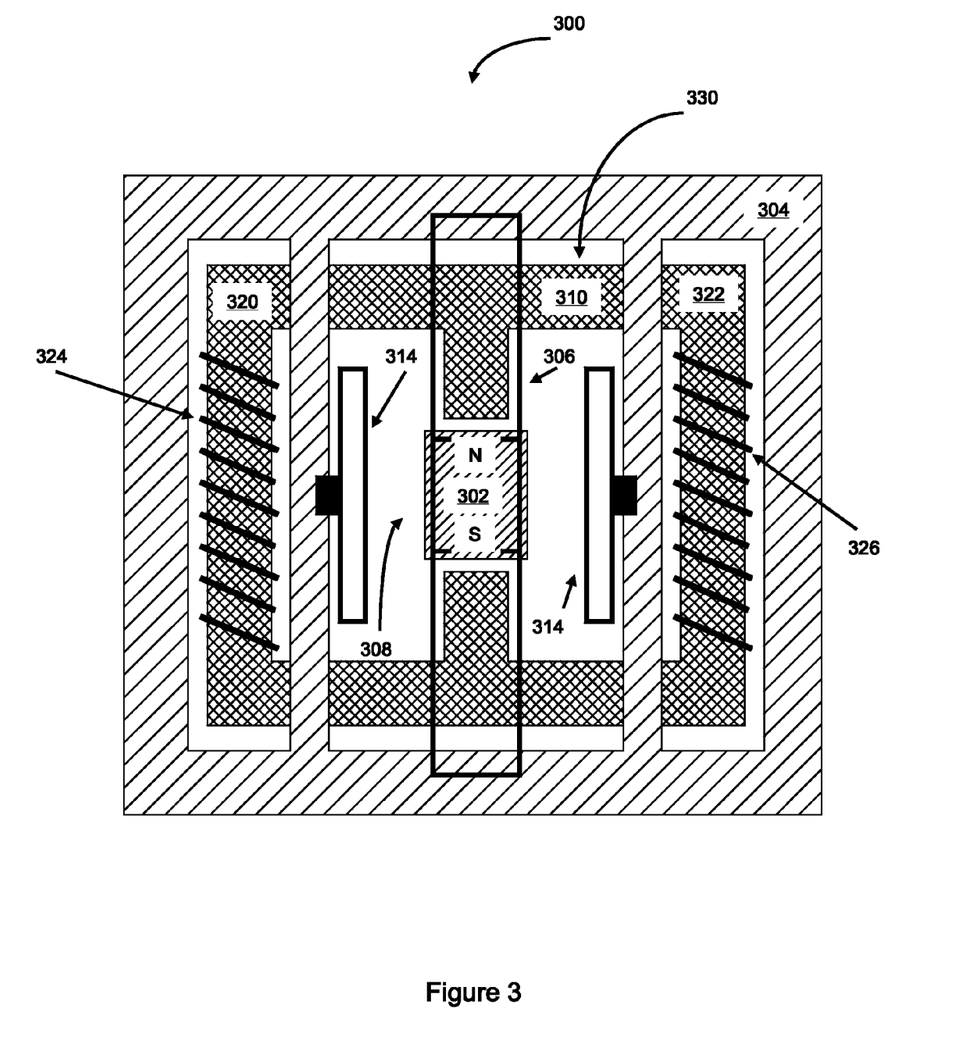
FIG. 3 is a schematic plan view illustration of a third embodiment of a mechanical vibration to electrical energy converter, according to the invention.

FIG. 3 is a schematic plan view illustration of a third embodiment of an apparatus 300 for converting mechanical vibrations into electrical energy, according to the present invention. In this embodiment, the ferromagnetic circuit 330 comprises one or more arms, e.g. 320 and 322, wherein each arm can have an electrically conductive coil 324 and 326 wrapped around the core portion of the corresponding arm of the ferromagnetic circuit 330. It can also be convenient to arrange the arms 320 and 322 in the planar configuration shown, to reduce the overall "height" or volume of the apparatus 300. The remaining elements, magnet 302, coupling 306, frame 304, gap 308, restrainer 314 and their function, are as described above. In the illustrated configuration, the motion of the magnet 302 can be constrained to occur substantially in the plane defined by ferromagnetic circuit 330.

The following exemplary embodiment of a "Hi-$\mu_r$ Core" VDRG comprises MEM components arranged in a single-magnet, single-core configuration of the type illustrated in FIGS. 1 and 2A-2C, and serves to illustrate many features of the invention. Design goals established for the device include; allow for modest materials performance, produce a power output of several volts and on the order of a couple hundred micro-watts and, utilize input accelerations (e.g. external vibrations) of 1 g (i.e. acceleration due to gravity) or less at 30-60 Hz.

Electroplated 78 Permalloy was chosen as the soft magnetic (e.g. ferromagnetic) material for the ferromagnetic circuit including the core, yoke and pickups, as processes are mature for forming laminated structures (e.g. to reduce Eddy current losses) for these components in LIGA. This alloy possesses low hysteresis losses with highest permeability and linear response in a field of less than about 0.6 T, with magnetic saturation occurring at fields below about 0.8 T.

To develop the maximum flux change in the ferromagnetic circuit comprising 78 Permalloy material for a given change in H introduced by the moving magnet, the magnetic circuit design and magnet material were selected to drive the 78 Permalloy to no more than 0.6 T. The relative permeability, $\mu_r$, of 78 Permalloy over this range is 1750. Finite element analysis showed that a bonded NdFeB (Neodymium Iron Boron) magnet material with a 10MGOe energy product is one suitable candidate for the magnet. A commercially available form of NdFeB magnet material has a residual induction, $B_r$, of 0.68 T and will not saturate the 78 Permalloy core given an equal cross-sectional area. Additionally, the coercive force, $H_c$, is moderately high at 460 kA/m, and will not be easily demagnetized.

An analysis of the magnetic circuit was performed using the "ANSYS Release—9.0 Multiphysics" tool available from ANSYS Inc., Canonsburg, Pa., USA, to estimate the magnetostatic force operating on the magnet (i.e. cogging force, translational force, magnetic restoring force) and B-field present in the core, as a function of magnet position, as the magnet moves through the gap in a pair of pickups (i.e. pickup portions of the ferromagnetic circuit). The magnet was 6 mm in length, 2.4 mm wide and 2.0 mm tall. The direction of travel of the magnet, the Z direction, lies along the 2.4 mm dimension. The ferromagnetic circuit has the same cross-sectional dimensions as the magnet and the respective lengths of the pickup and yoke portions of the ferromagnetic circuit are 5 mm and 3 mm. The portion of the core available for the coil being approximately 16 mm in length. The clearances between the magnet and the pickup ends were 0.1 mm (i.e. total gap between pickups was about 6.2 mm, with the 6 mm long magnet suspended therein).

Figure 4A:
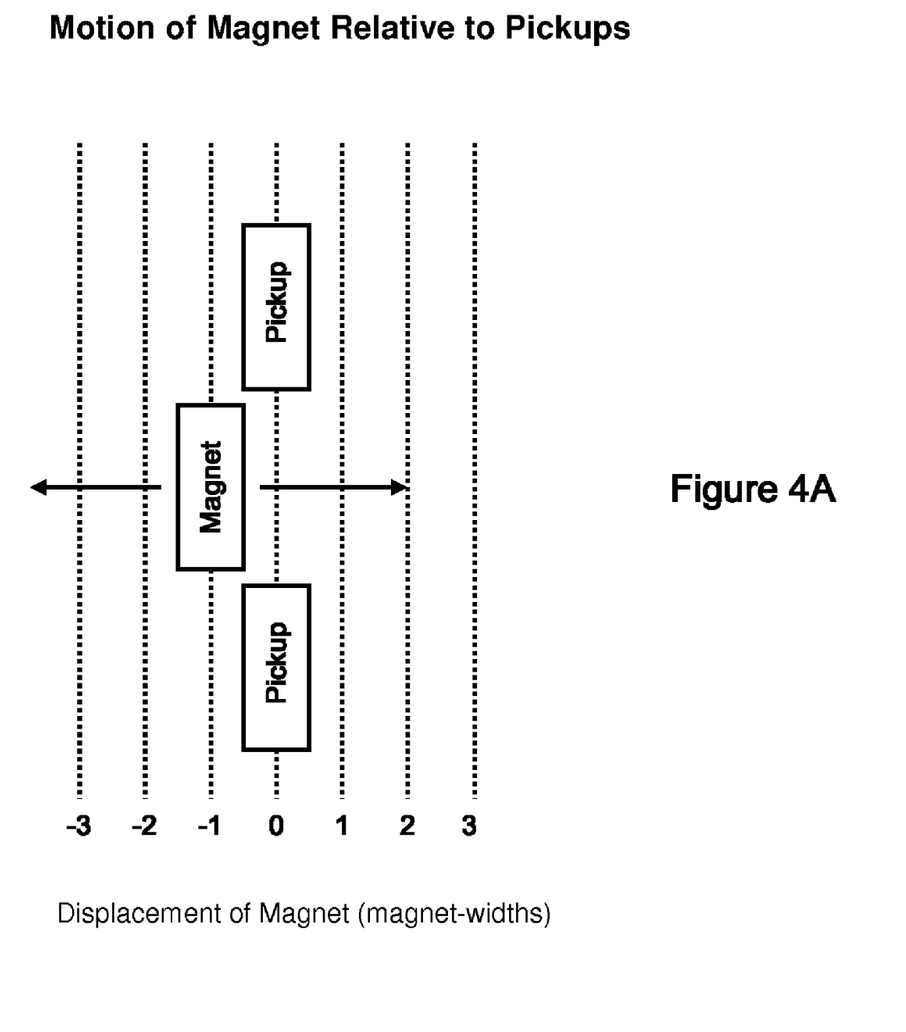
FIG. 4A is a schematic plan view illustration of the motion of a magnet relative to a core (pickup) as used in an analytical model of an exemplary embodiment.

FIG. 4A is a schematic illustration of the configuration modeled and shows the displacement of the magnet, in units of magnet width, as the magnet moves through the gap between the two pickups.

Figure 4B:
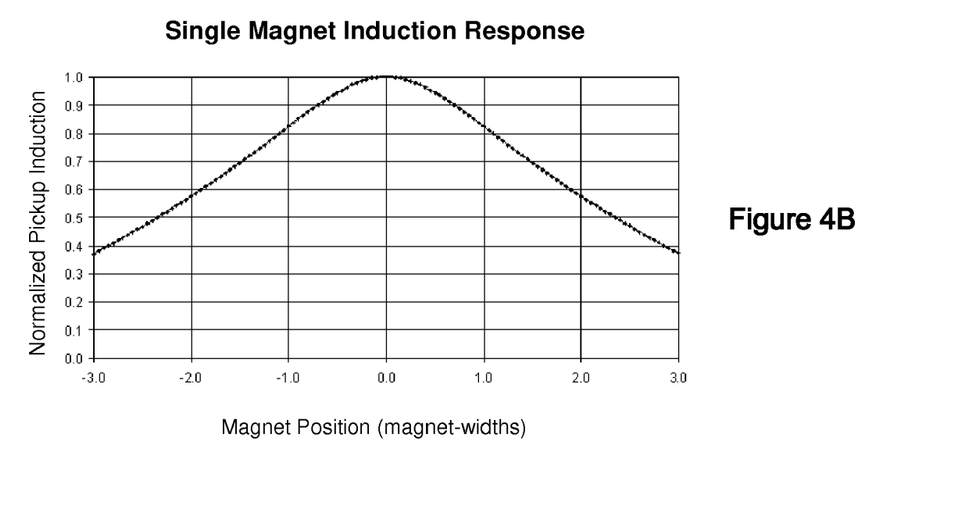
FIG. 4B presents a result of the analysis, a plot of the normalized magnetic induction in a pickup as a function of magnet displacement.

FIG. 4B presents a result of the finite element analysis, the normalized magnetic induction in a pickup as a function of magnet displacement. FIG. 4B indicates that a maximum in the magnitude of the core induction occurs when the magnet is in alignment (i.e. displacement of "0") with the pickups.

Figure 4C:
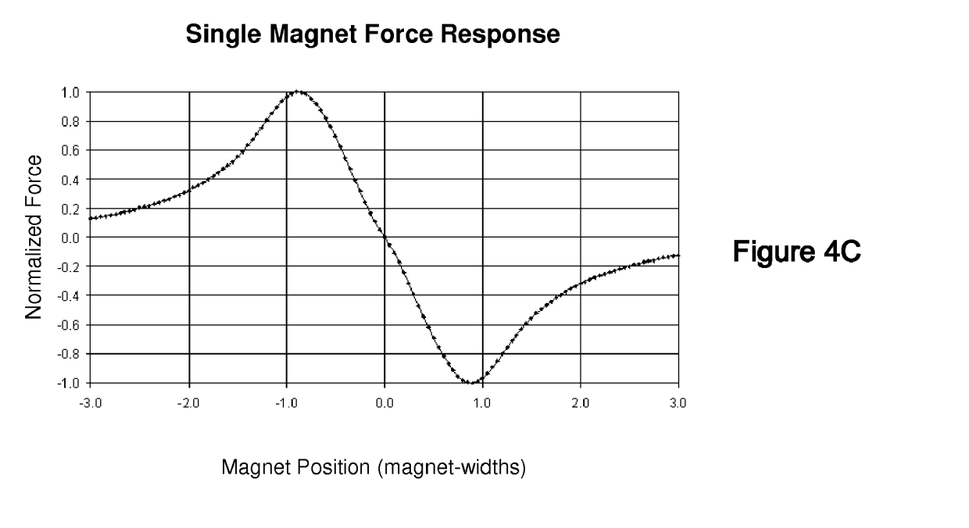
FIG. 4C presents another result of the analysis, a plot of the normalized magnetostatic force operating on the magnet as a function of the displacement of the magnet.

FIG. 4C presents another result of the analysis, the normalized static magnetic force operating on the magnet as a function of the displacement of the magnet. FIG. 4C illustrates that the magnetostatic force is minimized at a displacement of "0" and increases as the magnet is displaced to either side of being in alignment with the pickups. This is reasonable as the aligned configuration (e.g. "neutral position") provides the lowest magnetic energy state for the system. The magnetostatic force acts on the magnet in a direction to return the magnet to the neutral position. As the magnet is displaced from the aligned position the core magnetic induction magnitude declines and the magnitude of the magnetostatic force increases to a maximum at a displacement of about "1" magnet widths. The changing core induction is of immediate value for transduction purposes; however the magnetostatic force (i.e. cogging, magnetic restoring force) as a function of the magnet displacement can be taken advantage of in the design of an energy harvester (e.g. VDRG) adopting the single-magnet single-core configuration.

Figure 4D:
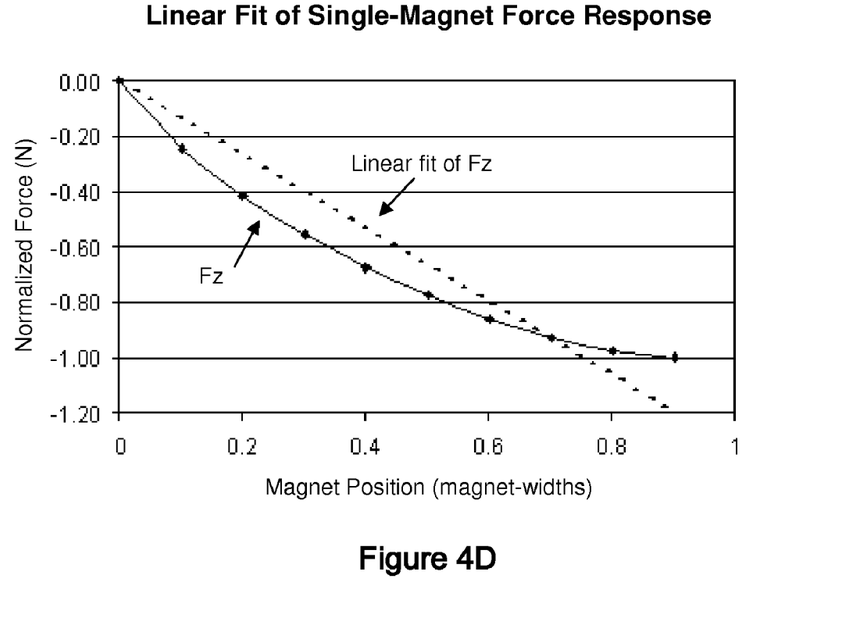
FIG. 4D presents a detail view of a portion of the results from FIG. 4C.

FIG. 4D presents a closer examination of the normalized magnetostatic force for magnet displacements ranging from "0" to a "positive" value of "1". Examination of the force "$F_z$" reveals an approximately linear force-displacement relationship exists within one magnet-width displacement from the center (linear fit of $F_z$). The magnetostatic force can be utilized to one's advantage in the design of a VDRG by operating the device over this approximately linear region of the magnetostatic force response plot, to create a restoring force for the magnet-mass body and ultimately facilitate the resonance response for the VDRG.

Figure 4E:
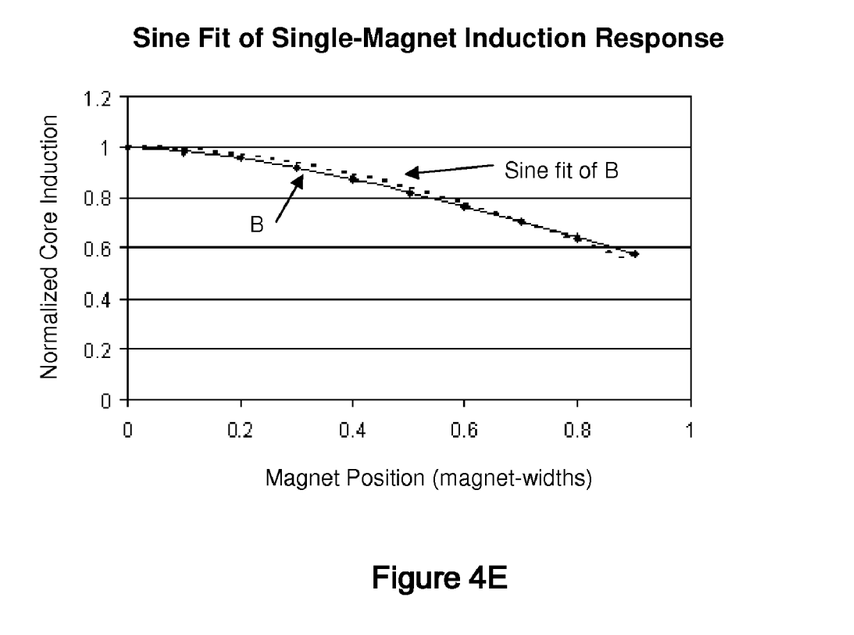
FIG. 4E presents a detail view of a portion of the results from FIG. 4B.

As can be seen in FIG. 4E the normalized pickup magnetic induction (i.e. in the core) is at its maximum value when the magnet has a zero offset from the pickups. This presents the lowest reluctance circuit condition and the full magnet remnant induction value, $B_r$, is nearly realized (i.e. in the core). To utilize a significant portion of the "linear" region of the force-displacement curve, embodiments of the invention can be designed (i.e. as a matter of convenience) to operate over a displacement range of approximately −0.9 to 0.9 magnet widths. As can be seen in FIG. 4E, the corresponding core induction declines to a fractional value, $f_B$, of approximately 0.55 of the maximum induction at a displacement of approximately 0.9 magnet-widths. The plot of the core magnetic induction, B, can be reasonably approximated by a sinusoid (e.g. "Sine fit" in the figure).

Writing the pickup induction $B_{pu}(z)$ as a function of magnet displacement, z, and a maximum displacement $z_{lim}=0.9$ magnet-widths yields:

$$B_{pu}(z) = B_r \left[ f_B + (1-f_B) \sin\left( \frac{\pi}{2} \frac{z}{z_{lim}} + \frac{\pi}{2} \right) \right].$$ (Eqn. 3)

Of interest is the voltage output of the electromagnetic transduction element, the time rate of change in the magnetic flux of the core (i.e. enclosed by the coil windings) is needed. If the magnet-mass of the VDRG moves sinusoidally with frequency, $\omega$, and amplitude $z_{amp} \leq z_{lim}$ then:

$$z(t) = z_{amp} \sin(\omega t)$$ (Eqn. 4)

Combining Equations 3 and 4 and requiring that $z_{amp}=z_{lim}$ for VDRG operation at resonance where $\omega=\omega_n$, and with optimal damping (as described by Mitcheson et al.) gives the pickup induction as a function of time (note $z_{lim} \equiv$ zlim in the following equations):

$$B_{pu,zlim}(t) = B_r \left\{ f_B + (1-f_B) \sin\left[ \frac{\pi}{2} ((\omega_n t) + \frac{\pi}{2}) \right] \right\}.$$ (Eqn. 5)

This modulated sinusoid may then be approximated yet again as a sinusoid with frequency doubling which yields:

$$B_{pu,zlim}(t) = \frac{B_r}{2} [(1+f_B) + (1-f_B)\cos(2\omega_n t)],$$ (Eqn. 6)

and the time rate of change of the pickup induction becomes:

$$\dot{B}_{pu,zlim} = B_r(1-f_B)\omega_n \sin(2\omega_n t).$$ (Eqn. 7)

The core magnetic induction (enclosed by the coil windings) can be calculated based on the pickup induction provided there is negligible flux leakage in the circuit and if the components of the ferromagnetic circuit are operated in their linear regime (e.g. not saturated) where their permeability is nearly constant. Since $B=\phi/A$, and given that the pickup area is $A_{pu}$ and the area of the ferromagnetic circuit is $A_{core}$, the core rate of change of magnetic induction is:

$$\dot{B}_{core,zlim} = \frac{A_{pu}}{A_{core}} B_r(1-f_B)\omega_n \sin(2\omega_n t).$$ (Eqn. 8)

The single-magnet "Hi-$\mu_r$ Core" systems capacity to convert a mechanical input (e.g. vibration) into electrical voltage and power, where the magnet moves with an amplitude of $z_{lim}$, can be estimated using six parameters. Combining Equation 1 and Equation 8 yields an expression for the voltage produced by a coil of N turns wrapped around the core as:

$$V_{zlim}(t) = -NA_{pu}B_r(1-f_B)\omega_n \sin(2\omega_n t).$$ (Eqn. 9)

The corresponding RMS voltage for this sinusoid is given by:

$$V_{zlim,RMS} = \frac{1}{\sqrt{2}} NA_{pu}B_r(1-f_B)\omega.$$ (Eqn. 10)

An estimate of the transduction system's power capacity follows, where $R_{tot}$ is the total resistance of the coil and the load it is powering. For an optimized system the maximum power transfer to the load occurs when the load and coil impedances are matched or $R_{load}=R_{coil}$.

$$P_{avg,zlim} = \frac{V_{zlim,RMS}^2}{R_{tot}} = \frac{A_{pu}^2 N^2 B_r^2 (1-f_B)^2 \omega^2}{2R_{tot}}.$$ (Eqn. 11)

From the analysis presented above, parameters affecting the single-magnet transduction system's power capacity are seen to include the area of the pickup, the number of turns in the coil, magnet strength, operating frequency and coil resistance.

For the exemplary embodiment above, the magnetic induction (FIG. 4E) may be approximated with a sinusoid (Eqn. 8) where $B_r=0.6$ T and $f_b=0.55$. The magnetostatic force curve can be fitted by linear regression and yields a magnetic spring constant of about 130 N/m. Simulation results of the magnetostatic forces normal to the plane of the air gap (i.e. directed along the long axis of the magnet) indicate a maximum contact force of 200 mN when the original air gap, i.e. clearance gaps, of 0.1 mm is reduced to zero. If a normal force developed by the magnet is desired to be less than 100 mN (for example, to meet a spring suspension force) the magnet must not be displaced more than 50 μm off center.

The voltage capacity of the electromagnetic system of the modeled system can be estimated by Equation 10 assuming $A_{pu}=2.4 \times 2.0$ mm, $B_r=0.6$ T and $f_B=0.55$ at a frequency f of 60 Hz or $\omega=2\pi \times 60$, and for a 3000-turn coil, then $V_{RMS} \sim 1.03$V.

The exemplary VDRG single-magnet prototype comprises a magnet/holder suspended by a folded flexure spring, ferromagnetic pickup circuit including the yoke, core and surrounding coil. Additional components provide structural alignment and transfer mechanical vibrations from an external source to the magnet housing. The magnet was conventionally machined from bonded NdFeB magnet stock to a dimension of 6.0×2.0×2.4 mm, and placed in a stainless steel magnet holder (which acts as the primary mass for the system) machined to 5.2×3.2×13.4 mm dimensions. The magnet holder was connected to the folded-beam spring suspension for the system.

The folded-beam suspension was fabricated using LIGA defined Permalloy as the structural material. Two beam lengths, 9.0 and 11.00 mm long were used in the flexures having a common width of 90 μm and height of 250 μm. The folded flexure permits the 1.8 g (gram mass) magnet/holder to move with an amplitude of 2.4 mm in the Z-direction. The spring flexures provide a linear force response over this deflection range and based on the standard beam mechanics, were designed to a spring constant of 113 N/m. When this spring force is added to that of the magnetostatic (i.e. magnetic spring) force of 130 N/m (from the fit of the linear curve in FIG. 4D) the resonant frequency can be estimated (see Mitcheson et. al.) as approximately 60 Hz.

The ferromagnetic circuit including pickups, yoke and core comprised laminated layers of 78 Permalloy, each layer being 200 µm thick and produced by LIGA methods. The laminates were stacked and mechanically pinned to form the overall structure. A thin layer of high resistivity material can be used to electrically isolate each of the stacked layers from one another. The core dimensions were 2.2×2.2×16.0 mm, which maintains an adequate cross-sectional area to prevent magnetic saturation and support a high-turn count coil. The core serves as a mandrel to form an 8-layer 3000-turn coil from 48 gauge magnet wire (e.g. copper wire). Overall dimensions of the coil were approximately 3.0 mm in diameter and 16 mm in length. This coil was hand wound but bulk processing methods using LIGA or other microfabrication techniques are envisioned as methods to increase fabrication throughput in future devices.

The frame of the exemplary VDRG provides a rigid structure for mounting the components comprising the device. To minimize thermal expansion effects, the frame was fabricated by wire electro-discharge machining (EDM) an AlSiC (aluminum-silicon carbide) metal matrix composite blank. The coefficient of thermal expansion of the AlSiC composite material is a close match to that of the Permalloy springs. This can be utilized to minimize buckling tendencies of the LIGA spring suspension components that can close the magnet to pickup air gap at cold temperatures. Therefore, by approximately matching the coefficient of thermal expansions of the frame and spring materials, the performance of the VDRG can be maintained over wide excursions in temperature. The resulting overall volume of the exemplary device and its housing was approximately 13 cm$^3$.

Figure 5:
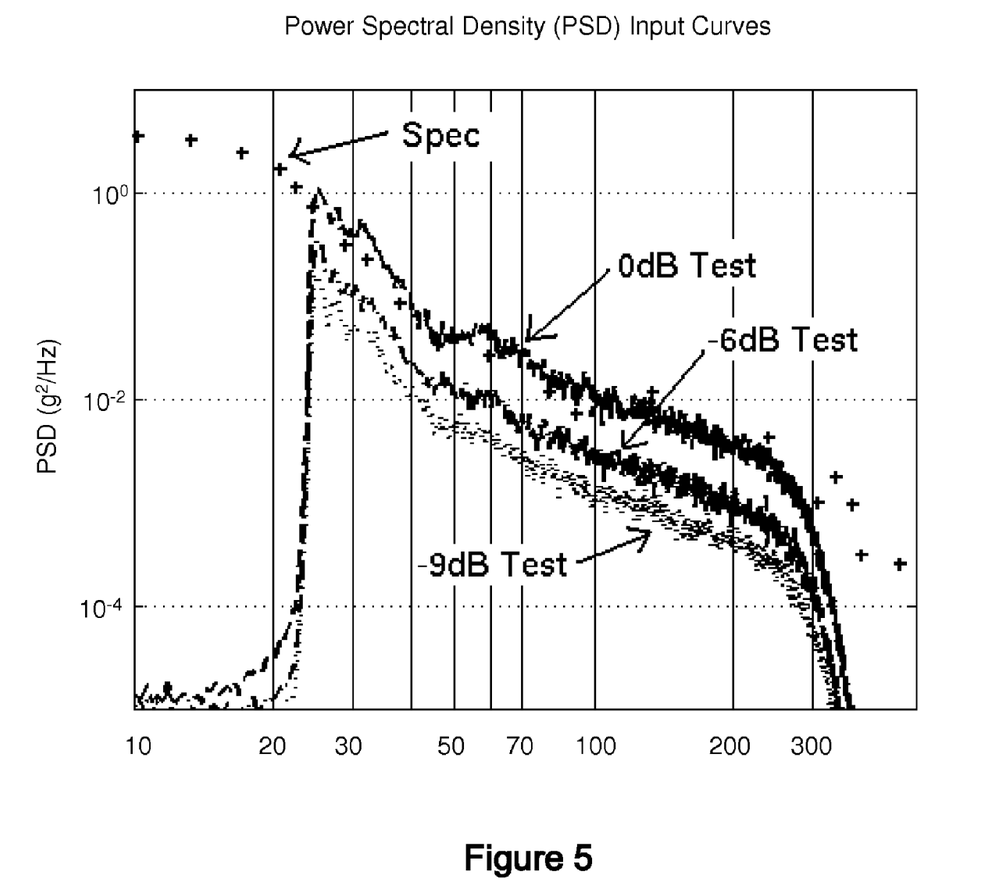
FIG. 5 is a plot of the power spectral density (PSD) curves for the input vibrations to an exemplary embodiment of the invention.

The exemplary device was subjected to a random base acceleration (i.e. vibration) simulating the power spectral density (PSD) curve for the wheel back plate of a passenger car on a paved roadway. (See for example, the Society of Automotive Engineers document: SAE J1211, "Recommended Environmental Practices for electronic Equipment Design, Recommended Practice", 1978). FIG. 5 presents the input PSD curves at three excitation levels ("0", "−6" and "−9 dB") as reproduced by a shaker table, and the specified level ("Spec") for the wheel back plate. The PSD at frequencies lower than 23 Hz were not important as the resonant frequency for the device is greater than 60 Hz. Average values of the voltage output and other operational parameters as measured for the exemplary VDRG are given in Table 1 below.

TABLE 1

Measured Output Characteristics for An Exemplary VDRG

| Excitation Level | dB | 0 | −6 | −9 |
|---|---|---|---|---|
| $V_{RMS}$ | mV | 545 | 233 | 214 |
| Resonant Frequency | Hz | 62.9 | 64.3 | 64.4 |
| Q | — | 39 | 51 | 63 |
| Base Acceleration | g's | 2.88 | 1.49 | 0.995 |
| Mass Velocity RMS | m/s | 0.495 | 0.273 | 0.257 |
| Relative Displacement RMS | mm | 1.96 | 1.04 | 0.985 |

The results presented in Table 1 indicate that with a reduction in excitation level the mass velocity and voltage output decrease as expected. Changes in "quality factor" (Q) and resonance frequency with excitation level show that the device is nonlinear due manly to the magnet interaction with the ferromagnetic pickups.

Figure 6:
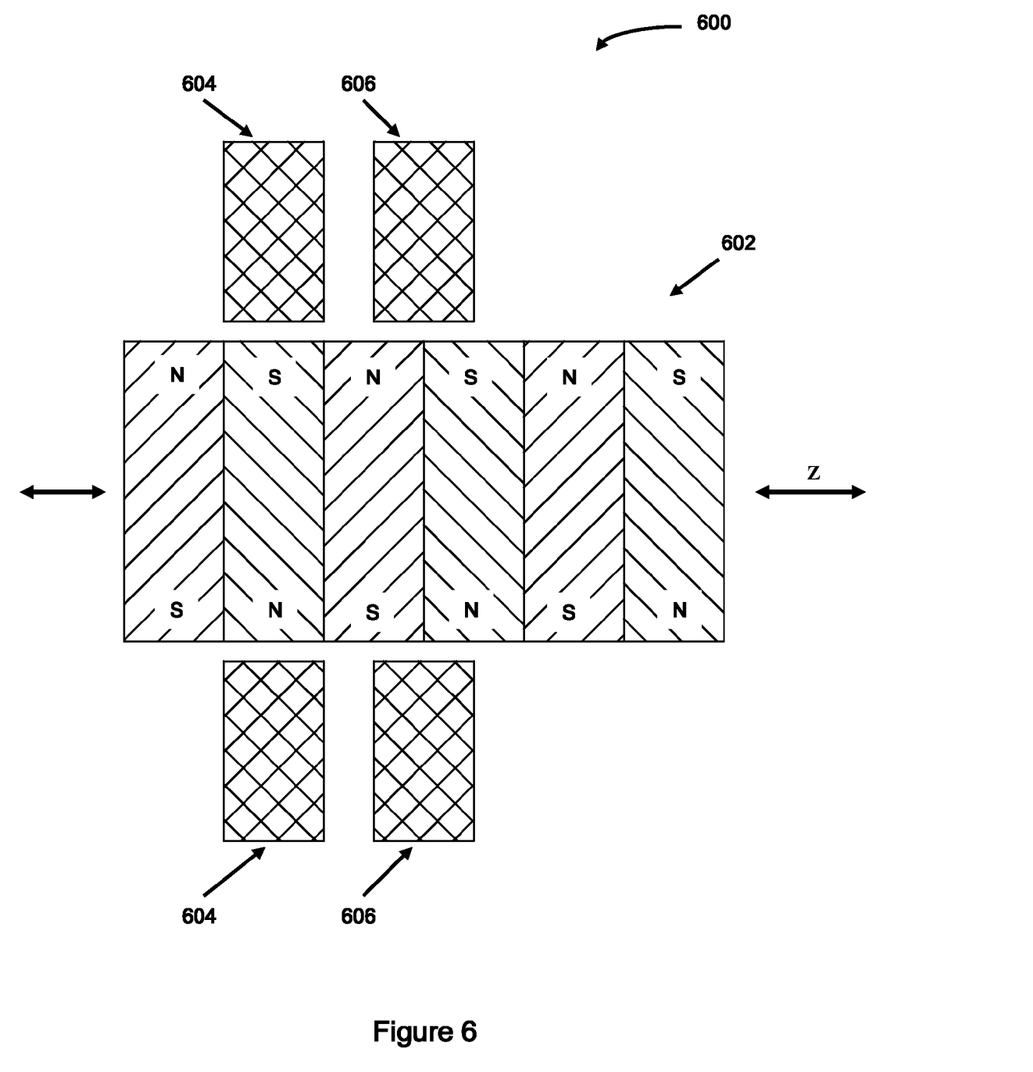
FIG. 6 is a schematic plan view illustration of a fourth embodiment of a mechanical vibration to electrical energy converter, according to the invention.

FIG. 6 is a schematic plan view illustration of another embodiment of an apparatus 600 for converting mechanical vibrations into electrical energy according to the invention, wherein an array of magnets 602 having alternating polarities can be incorporated with multiple pickups 604 and 606 (i.e. multiple ferromagnetic circuits) to maximize magnetic flux changes in the multiple ferromagnetic circuits and to minimize the magnetostatic (i.e. cogging) forces through proper phasing (i.e. dimensioning and spacing) with mechanically coupled magnets. Again a finite element model of this configuration was created and analyzed using the "ANSYS Release—9.0 Multiphysics Tool". The example modeled comprised a 17 magnet-array and a two core configuration (i.e. two ferromagnetic circuits). The magnetic induction within each core and the force on the entire magnet-array was calculated as a function of magnet-array position using magnet-width as the measure of displacement (as above).

Figure 7A:
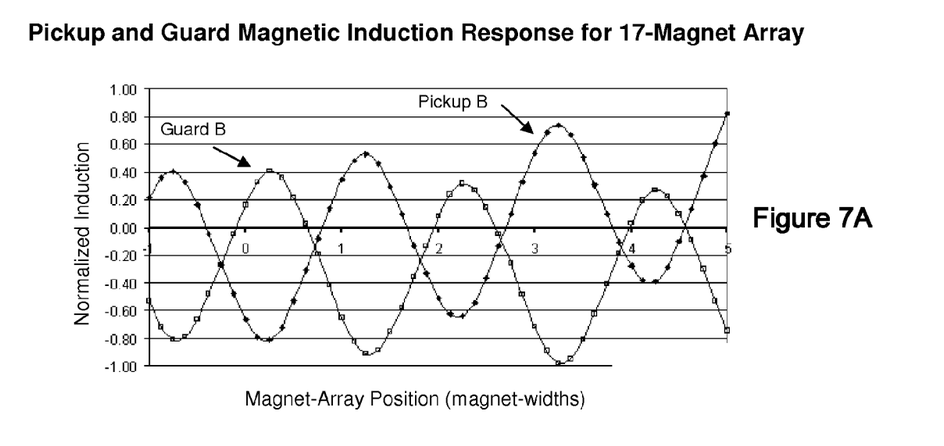
FIG. 7A presents a result of an analysis of the fourth embodiment, a plot of the normalized magnetic induction as a function of magnet array displacement.

FIG. 7A presents the normalized magnetic induction in each pickup (i.e. pickup and guard) portion of each ferromagnetic circuit as a function of the magnet-array position.

Figure 7B:
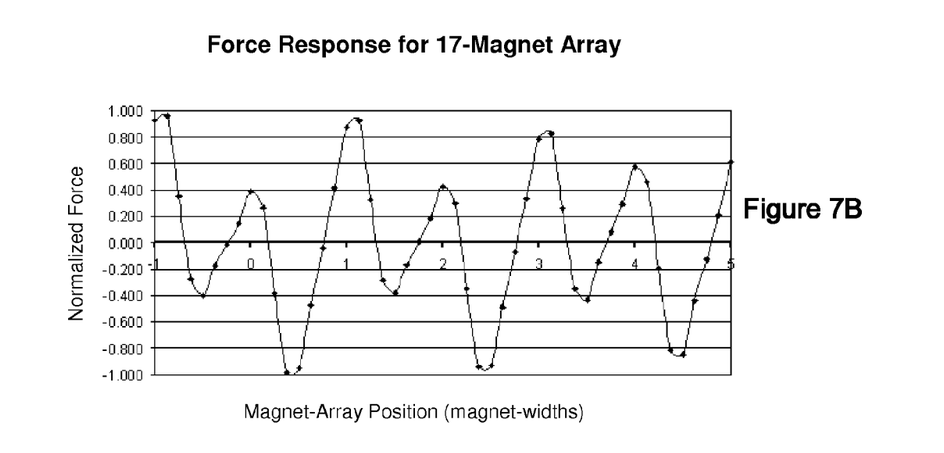
FIG. 7B presents another result of the analysis of the fourth embodiment, a plot of the normalized magnetostatic force acting on the magnet array as a function of the magnet array displacement.

FIG. 7B presents the normalized magnetostatic force operating on the magnet-array as a function of magnet position.

In general, the amplitude of the B-field in the ferromagnetic circuit is roughly one sixth of what a single magnet in alignment with a single pickup would produce. Assuming constant cross-sectional areas, if a magnet with a remnant induction of 1.2 T were used then a 0.2 T amplitude B-field could be achieved in the core. As one is interested in the rate of change in flux, for generating a voltage output with a coil, the velocity of the magnet array should be maximized to achieve the highest voltages possible. Another method to increase the rate of flux change, at a constant magnet translational velocity, is to increase the depth of the magnet and pickup in the Y-direction (i.e. into and out of the plane of the illustration). Although not immediately obvious, decreasing the magnet width in the Z-direction (i.e. the direction of motion) and using more magnets to maintain the same overall magnet array width does not affect the rate of flux change in the core. As the magnets are made narrower, the polarity flips more rapidly; however, the B-field and flux amplitudes are commensurately reduced.

Finite element simulation shows that as the magnet array is translated quasistatically along the two-pickup configuration a rather complicated response in the magnetostatic force evolves (FIG. 7B). An approach to minimizing the magnetostatic force may be considered where another pickup or pair of pickups is spaced along the magnet array (i.e. phased) in a way such that the force generated by the interaction of the each of the pickups with the magnet-array, cancel each other (i.e. in a phased configuration). Analysis has shown that to achieve a degree of force cancellation as may be desired in the design of a VDRG of this configuration, i.e. phasing of spaced multiple pickups with a magnet-array, one desires to overcome the asymmetry in the individual force peaks as shown in FIG. 7B.

The above described exemplary embodiments present several variants of the invention but do not limit the scope of the invention. Those skilled in the art will appreciate that the present invention can be implemented in other equivalent ways. The actual scope of the invention is intended to be defined in the following claims.

What is claimed is:

1. An apparatus for generating a voltage in response to an external source of vibrations, the apparatus comprising:
   a frame;
   a ferromagnetic circuit attached to the frame, the ferromagnetic circuit having a gap;
   an electrically conductive coil wound around at least a portion of the ferromagnetic circuit;
   a magnet moveably coupled to the frame by a coupling, the coupling operatively arranged to allow a motion of the magnet through the gap, the frame comprising a material having a coefficient of thermal expansion that approximately matches a coefficient of thermal expansion of the coupling;
   a restrainment for limiting an extent of the motion of the magnet, whereby the motion of the magnet through the gap induces the voltage in the coil.

2. The apparatus of claim 1 wherein the apparatus comprise a MEM (micro-electromechanical device.

3. The apparatus of claim 1 wherein the coupling constrains the motion of the magnet to be substantially in a plane defined by the ferromagnetic circuit.

4. The apparatus of claim 1 wherein the coupling constrains the motion of the magnet to be substantially in a plane perpendicular to a plane defined by the ferromagnetic circuit.

5. The apparatus of claim 1 wherein the ferromagnetic circuit comprises a plurality of ferromagnetic arms and, at least one electrically conductive coil wrapped around at least a portion of at least one of the plurality of ferromagnetic arms.

6. The apparatus of claim 1 wherein the extent of the motion of the magnet corresponds to a substantially linear range of a magnetically induced restoring force operating on the magnet.

7. An apparatus for generating a voltage in response to an external source of vibrations, the apparatus comprising:
   a frame;
   a magnet attached to the frame;
   a ferromagnetic circuit moveably coupled to the frame by a coupling, the ferromagnetic circuit having a gap, the coupling operatively arranged to allow a motion of the ferromagnetic circuit whereby the magnet passes through the gap during the motion, the frame comprising a material having a coefficient of thermal expansion that approximately matches a coefficient of thermal expansion of the coupling;
   an electrically conductive coil wound around at least a portion of the ferromagnetic circuit; and,
   a restrainment for limiting an extent of the motion of the ferromagnetic circuit, whereby the motion of the magnet through the gap induces the voltage in the coil.

8. The apparatus of claim 7 wherein the apparatus comprises a MEM (micro-electromechanical) device.

9. The apparatus of claim 7 wherein the coupling constrains the motion of the ferromagnetic circuit to be substantially in a plane defined by the ferromagnetic circuit.

10. The apparatus of claim 7 wherein the coupling constrains the motion of the ferromagnetic circuit to be substantially in a plane perpendicular to a plane defined by the ferromagnetic circuit.

11. The apparatus of claim 7 wherein the ferromagnetic circuit comprises a plurality of ferromagnetic arms and, at least one electrically conductive coil wrapped around at least a portion of at least one of the plurality of ferromagnetic arms.

12. The apparatus of claim 7 wherein the extent of the motion of the ferromagnetic circuit corresponds to a substantially linear range of a magnetically induced restoring force operating on the ferromagnetic circuit.

\* \* \* \* \*